United States Patent Office 3,395,816
Patented Aug. 6, 1968

3,395,816
HYDRAULICALLY-OPERATED MECHANISMS
SUITABLE FOR USE IN DIGGING MACHINES
John E. Hodges, Purton, near Swindon, Philip G.
Joyner, Brockworth, and Cedric D. Weaver, Shurdington, near Cheltenham, England, assignors to
Dowty Hydraulic Units Limited, Cheltenham,
England, a British company
Filed Mar. 24, 1967, Ser. No. 625,784
Claims priority, application Great Britain, Apr. 7, 1966,
15,638/66
14 Claims. (Cl. 214—138)

ABSTRACT OF THE DISCLOSURE

A digging mechanism includes a parallelogram linkage operable by two rams normally controlled by manually-operable valves. When it is required automatically to cause the digging implement to follow a predetermined path, for example to produce a flat base to a trench being dug, one control valve is isolated from its ram and a single servo valve is brought into operation. This servo valve is so connected to the parallelogram linkage that it is operable by the linkage upon displacement of the remaining normally-operating ram. In this way the ram then controlled by the servo valve superimposes upon the normally-controlled movement of the implement by the other ram such correcting displacement as to achieve the desired predetermined path.

Background of the invention (i) *Field of the invention.*—This invention relates to hydraulically-operated mechanisms, suitable for use in digging machines, of the type including a first arm or "boom" pivoted directly to the machine and a second arm or "dipstick" pivoted to the first arm, the second arm in turn carrying a digging implement. The first arm is controllable by a fluid-pressure-operable ram extending to the arm directly from the machine and the second arm is controllable by a fluid-pressure-operable ram extending back to the first arm, the two rams being controllable by operation of respective control valves. Such a mechanism is hereinafter referred to as "a mechanism of the type described."

(ii) *Description of the prior art.*—In the complete specification of our United Kingdom Patent No. 1,004,-162 there is disclosed a mechanism of the type described which also includes a pair of auxiliary links so pivotally connected together and also to the first and second arms as, with said arms, to provide a parallelogram linkage, the pivot connecting the two auxiliary links being constrained to follow a predetermined path shaped in accordance with the desired path of the implement. The pivot applies feed-back to both of said control valves controlling said rams in a manner so that the rams operate to cause the arms to maintain the said desired path of the implement.

Summary of the invention

According to this invention a mechanism of the type described includes a pair of auxiliary links so pivotally connected together and also to said first and second arms as, therewith, to provide a parallelogram linkage, the pivot connecting the two auxiliary links engaging cam means itself carried by a single servo valve which can be brought into circuit with the ram controlling one of said arms, the pivot then applying to the servo valve feed-back movement in dependence upon the constraining effect between the pivot and the cam means, which effect causes the said ram controlling one of said arms to super- impose upon the normally-controlled movement of the implement by the other ram such corrective displacement as to cause the implement accurately to follow a path predetermined by the shape and/or the attitude of the cam means.

The attitude of the cam means and of the servo valve may be adjustable with respect to the machine to afford a degree of slope in the path of the implement.

The cam means may comprise a member having an elongated slot or slide with which the pivot engages, the member being formed at the extremity of a rod or the like connected to a displaceable element forming part of the servo valve, the axis of the slot or slide being set at right-angles to the axis of the displaceable element. The displaceable element may be a spool which is housed for sliding movement within a ported sleeve, itself arranged for sliding movement in a block carried on the machine. The block may be pivotally mounted upon the machine to enable the adjustment referred to in the preceding paragraph to be effected.

A clamping ram may be provided to lock the ported sleeve with respect to the block, and the spool be provided with a fluid pressure-operable detent device engageable with the spool.

The servo valve may be arranged so that it can be brought into circuit with the ram which controls the first arm or boom, a change-over valve being provided to divert flow of pressure fluid to the servo valve.

The normal control valve for the ram which controls the second arm or dipstick is hydraulically separate from the other normal control valve but may be arranged in the same control valve bank.

During normal operation of the first ram, the servo valve sleeve which is locked with respect to the valve spool by the detent device may be permitted freely to reciprocate in the block under the displacements of the parallelogram linkage, the clamping ram being unpressurised and thus having no locking effect.

A preference flow valve may be arranged downstream of said change-over valve so that when upon appropriate adjustment of the change-over valve the servo valve is brought into circuit with the boom-operating ram. The preference flow valve ensures that before pressure fluid passes to the dipstick-operating valve and ram, said clamping ram is operated to lock the sleeve of the servo valve with respect to the block, and, more important, ensures also that adequate pressure fluid is available for the boom-operating ram during servo operation.

The preference flow valve is preferably pressure-compensated so that the servo valve can receive maximum supply pressure irrespective of the pressure level in the dipstick-operating ram at the same time. Generally, under these conditions the dipstick-operating ram will operate at a lower pressure level than the boom-operating ram.

The boom-operating ram is then only operable under the signals fed back through the parallelogram linkage to the spool, the cam means then controlling the first ram to move sufficiently only to superimpose movement on the linkage as to attain the predetermined path of the implement.

In this way when the operator of the machine requires the implement to follow this path, for example for producing a flat base to a trench being dug, he merely operates the change-over valve to change operation of the digging mechanism under the two normal control valves to operation under one normal control valve and the automatic servo valve.

Brief description of the drawings

Of the two accompanying drawings.

Description of the preferred embodiment

Figure 1:
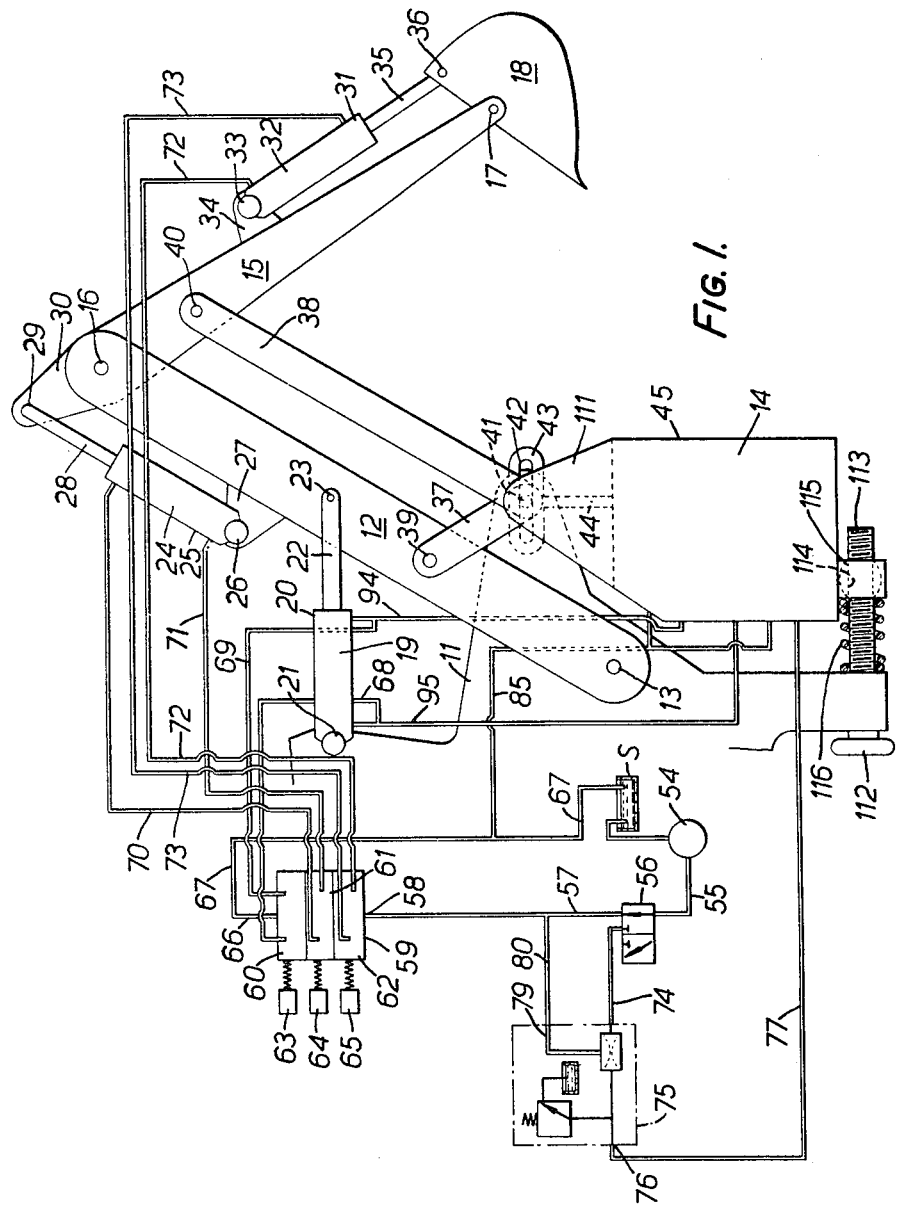
FIGURE 1 is a general view of a part of a digging machine in accordance with the invention, and, FIGURE 2 is an enlarged view of a portion of the machine shown in FIGURE 1 which shows in cross-section servo valve structure contained therein.
Figure 2:
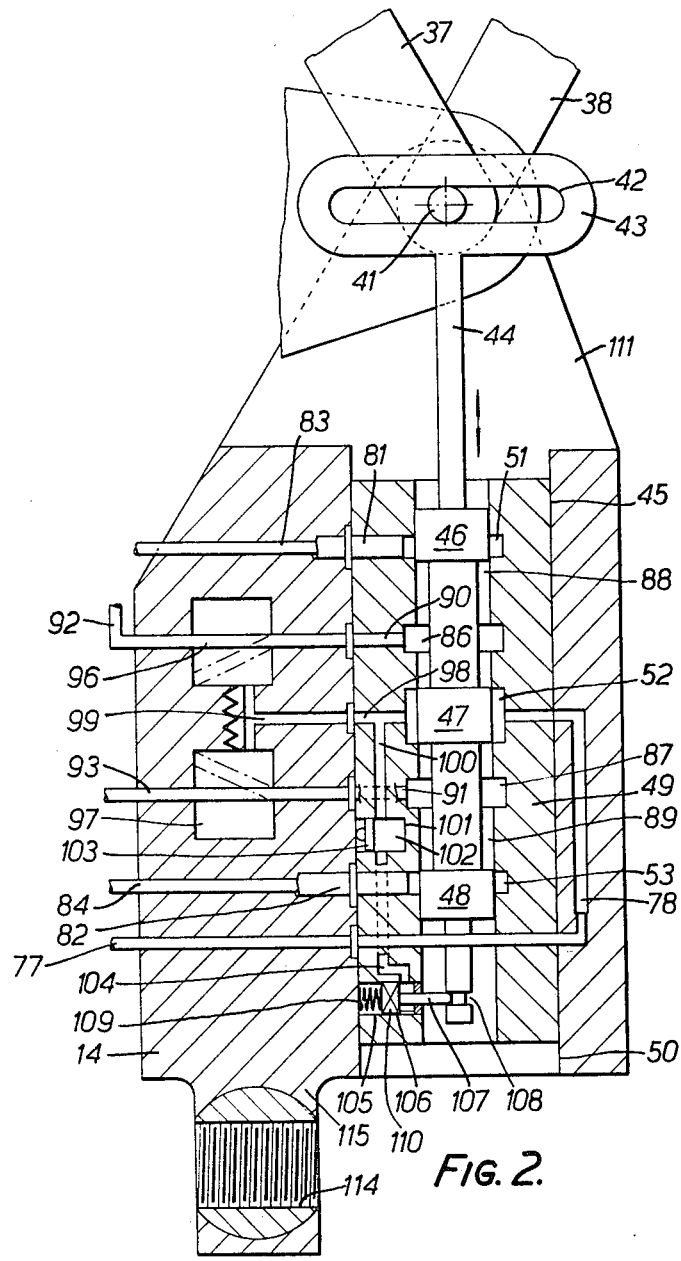

With reference to the drawings an hydraulically-operated digging machine, part only of the structure of which is shown at 11, includes a first arm or boom 12 pivotally connected at 13 to the machine structure, a valve block 14 being mounted upon the structure beneath the boom with provision for adjustability in attitude as later described.

A second arm or dipstick 15 is pivotally connected at 16 to the end portion of the boom remote from the pivotal connection 13. At its end portion remote from the pivotal connection 16, the dipstick is pivotally connected at 17 to a digging implement in the form of a bucket 18.

Angular movement of the boom 12 about its pivot 13 is controlled by a first hydraulic ram 19 whose cylinder 20 is pivotally connected at 21 to the machine structure and whose piston rod 22 is pivotally connected at 23 to an intermediate point along the length of the boom 12. Angular movement of the dipstick 15 about its pivotal connection 16 to the boom is controlled by a second hydraulic ram 24 whose cylinder 25 is pivotally connected at 26 to a pair of lugs 27 carried by the boom 12. The piston rod 28 of the second ram 24 is pivotally connected at 29 to the extreme end portion 30 of the dipstick 15 remote from the bucket 18 and which projects beyond the pivotal connection 16.

Pivotal movement of the bucket 18 with respect to the dipstick 15 is under the control of a third ram 31 whose cylinder 32 is pivotally connected at 33 to a pair of lugs 34 carried on the dipstick 15. The piston rod 35 of the ram 31 is pivotally connected at 36 to the bucket 18.

Two auxiliary links 37 and 38 are respectively pivoted at 39 and 40 to the boom 12 and the dipstick 15. These two links are pivotally connected together at 41 and are of such length and connected to the boom and dipstick at such positions as to provide, with the boom and dipstick, a parallelogram linkage. The pivot pin 41 connecting the two auxiliary links 37 and 38 engages cam means in the form of an elongated slot 42 in a normally horizontally-directed member 43 carried by a normally-vertically-mounted spool 44 forming part of a servo valve 45. The spool 44 is provided with three lands 46, 47 and 48 and is capable of linear sliding movement in a ported sleeve 49. This sleeve is housed in a bore 50 formed in the block 14.

As shown in the drawings, the spool 44 is in its neutral position, the land 46 closing over a drain annulus 51 formed in the sleeve, the land 47 closing over a pressure supply annulus 52 formed in the sleeve and the land 48 closing over another drain annulus 53 also formed in the sleeve.

Liquid under pressure for operation of the system is derived from a pump 54 driven in convenient manner and drawing its liquid from a sump S. The outlet of the pump is connected by a pipe 55 to a change-over valve 56. A first outlet from the change-over valve is connected by way of a pipe 57 to a single inlet connection 58 on a control valve bank 59. This bank comprises three spool valves 60, 61 and 62 of conventional type and each operable by manual control members 63, 64 and 65 respectively.

In open-centre manner when all of the spools in the bank 59 are in their neutral positions a direct route is provided from the inlet connection 58 to a single outlet connection 66 which connects by way of pipe 67 back to a sump S.

When any one of the spools is selected, this direct route is closed and pressure is immediately available at the operative spool for direction to its associated service.

The spool valve 60 is connected by service lines 68 and 69 to the first ram 19 which operates the boom 12.

The second spool valve 61 is connected by means of service lines 70 and 71 to the second ram 24 which operates the dipstick 15 and the third spool valve 62 is connected by means of service lines 72 and 73 to the third ram 31 which operates the bucket 18.

The second outlet of the change-over valve 56 is connected by way of a pipe 74 to a preference flow valve 75 having a preference outlet 76 which is connected by way of a pipe 77 and passageway 78 to the annulus 52 in the servo valve sleeve 49. The secondary outlet 79 of the preference flow valve 75 is connected by a pipe 80 to the pipe 57 at a point intermediate the first outlet of the change-over valve 56 and the inlet connection 58 of the control valve bank 59.

The annuli 51 and 53 in the sleeve 49 respectively open into drain ports 81 and 82 which co-operate with drain passageways 83 and 84 respectively in the block 14. These passageways join into a common passageway 85 which is connected with the drain pipe 67.

Annuli 86 and 87 also formed in the sleeve 49 and open respectively to the annular spaces 88 and 89 formed between the lands of the spool 44, open respectively to ports 90 and 91. These ports respectively co-operate with passageways 92 and 93 in the block 14. The passageways 92 and 93 are respectively connected by way of pipes 94 and 95 with the pipes 69 and 68, which themselves are connected to the first ram 19.

The passageways 92 and 93 each incorporate hydraulic lock valves 96 and 97.

The annulus 52, by way of which pressure liquid is introduced to the servo valve assembly, opens into a port 98 which co-operates with a passageway 99 capable of feeding pressure liquid to both the lock valves 96 and 97. With such feed maintained the valves 96 and 97 are held open, but when the feed is cut off the lock valves become operative to close the passageways 92 and 93.

A branch passageway 100 is taken from the port 98 and passes down through the sleeve 49 to the cylinder 101 of a clamping ram 102 whose piston 103 is urged against the bore 50 when pressure liquid is received by the cylinder 101. In this way the clamping ram positively locks the sleeve 49 with respect to the bore 50. A further passageway 104 is taken from the cylinder 101 further downwardly in the sleeve 49 to the cylinder 105 of an hydraulically-operated detent device 106. The piston rod 107 of this device is shown in its operative position in which it is engaged with an indent 108 in the lower end portion of the spool 44, thus to hold the spool fast with the sleeve 49. A coil spring 109 which bears on the piston 110 of the device holds the piston rod 107 in its engaged condition.

Release of the detent device occurs when pressure liquid is introduced through the passageway 104 to the interior of the cylinder 105.

In order to render the valve block adjustable with respect to the structure 11 of the machine for the purpose hereinafter described, the block is provided with a pair of upstanding bracket portions, one of which is shown at 111. These bracket portions provide the means for pivotally supporting the block 14 from the structure 11 of the machine, the pivotal mounting of the block being coincident with the pivot pin 41 when in the position shown in the drawing.

Adjustment in the angular setting of the block 14 with respect to the structure 11 is effected by rotation of a member 112 which turns a screw-threaded rod 113, itself in engagement with a screw-threaded part-spherical bush 114 carried in a lug 115 integral with the block. A coil spring 116 is interposed between the lug 115 and the adjacent portion of the structure 11.

In practice other sections are provided in the control valve bank 59 for controlling further rams for slew of the bucket 18 and for stabilization of the digging machine upon the ground during digging operation. However, such control valves and associated equipment form no part of the present invention and thus are not described or shown.

The first, second and third rams 19, 24 and 31 are all operable in double-acting manner "visually" by the operator, the first ram normally controlling swinging of the boom 12 in normal digging, the second ram controlling swinging of the dipstick 15 during normal digging and the third ram operating the bucket 18 during normal digging. No feed-back or follow-up is afforded in such operation and the accuracy in digging depends entirely upon the operator's skill in manipulating the control valves differentially.

During such normal-digging operation the change-over valve 56 is in its first or "normal-digging" position so that the delivery of the pump 54 passes only through the pipe 57 to the control valve bank 59 to enable the three rams 19, 24 and 31 to be operated by the direction of pressure liquid to and the exhausting of liquid from the respective rams by way of the pipes 68, 69; 70, 71; and 72, 73.

During such digging the spool 44 of the servo valve 45 is locked by the detent device 106 to the sleeve 49 of the valve, the coil spring 109 urging the piston rod 107 into engagement with the indent 108. This is the case because the pipe 77 is not pressurised and thus the cylinder 105 also is not pressurised.

Further, the cylinder 101 of the clamping ram 102 is not pressurised and this permits the spool 44 and the sleeve 49 freely to reciprocate as one in the bore 50, such movement being under the effect of the auxiliary links 37 and 38 as they move with the boom 12 and the dipstick 15.

Leakage from the boom-operating ram 19 through the servo valve spool 44 during the normal digging function is prevented by the lock valves 96 and 97 which are then in their operative, locking condition.

The change-over valve 56 is moved from its first or "normal-digging" position to its second or "constant level" position when the machine reaches a stage in the normal digging function when all the heavy digging has been completed and when it is required to produce a flat base to the trench being dug. At this stage a more accurately-controlled and constrained digging path is therefore necessary and the bucket is required to move along a straight line, this being predetermined by the shape of the slot 42 of the member 43.

Just prior to the movement of the change-over valve to its second position, however, the boom ram 19 is normally operated so that the bucket 18 is positioned at its required final digging depth. Such operation of the change-over valve closes off the direct route from the pump 54 to the valve bank 59 and flow of liquid occurs to the preference flow valve 75 which ensures that before the pressure liquid can pass by another route (which comprises secondary outlet 79, pipe 80 and pipe 57) to the valve bank 59, flow is first diverted through the preference outlet 76, pipe 77, passageway 78, annulus 52, port 98 and passageway 100 to operate the clamping ram 102 for locking the sleeve 49 to the block 14.

Also substantially at the same time the cylinder 105 is pressurised so that the piston 110 is moved to the left in the drawing against the effort of the coil spring 109 so that the piston rod 107 is disengaged from the indent 108. Also, substantially simultaneously, pressure liquid passes through the passageway 99 to effect opening of the lock valves 96 and 97 so that a direct communication is made from the annulus 86, through the port 90, the passageway 92 and the pipe 94 to one side of the boom-operating ram 19, while a direct communication is also effected from the annulus 87, through the port 91, the passageway 93 and the pipe 95 to the other side of the ram 19.

The ram 19 is now no longer operable under the control of its manually-operated control valve 60 in the bank 59 and the manual control member 63 of this valve is rendered immovable by suitable means (not shown).

However, the bank is supplied with pressure fluid from the secondary outlet 79 of the preference flow valve 75 through the pipes 80 and 57, so that the control valve 61 can be operated normally for control of the dip-stick-operating ram 24. The valve 62 is not operated during "constant level" control, the bucket 18 thus being left in a set condition with respect to the dipstick.

The boom-operating ram 19 is now operable under the control of the parallelogram linkage 12, 15, 37, 38, pivot pin 41 and cam slot 42 automatically to superimpose upon manually-initiated movement of the mechanism effected by the dipstick-operating ram 24, movement which so corrects the overall movement of the mechanism that the bucket 18 follows the desired straight path determined by the shape of the cam 42.

More specifically, swinging digging movement of the dipstick 15 occurring under the control of the dipstick spool control valve 61 causes feed-back movement from the parallelogram linkage and pivot 41 which is applied to the servo valve spool 44. Movement of this spool is now permitted with respect to the sleeve 49 because the detent device 106 has been released from the indent 108.

As shown in the drawing the spool 44 is in its neutral position, but movement thereof either upwardly or downwardly in the sleeve causes pressure liquid available in the annulus 52 to pass to the appropriate side of the boom-operating ram 19, passing thereto through either the annuli 88; 86 or the annuli 89; 87, and the ports, passageways and pipes associated therewith. At the same time the unpressurised side of the ram 19 is placed in communication with drain through the associated pipes, passageways and ports, the annulus 88 or 89 as the case may be, and the drain port 81 or 82 which themselves communicate with the sump S.

Consequent displacement of the piston rod 22 of the ram 19 effects movement of the boom 12 about its pivotal mounting 13 in such a manner as to correct the path of movement of the bucket 18 to the straight line characteristic determined by the shape of the cam 42.

The preference flow valve 75 is pressure-compensated in convenient manner, so that the servo valve can always receive maximum supply pressure irrespective of the pressure level in the dipstick-operating ram 24 at the same time.

After levelling off the trench, reversion to normal digging can be achieved merely by moving the change-over valve 56 back to its "normal-digging" position, thereby cutting off pressure liquid supply to the pipe 77 and depressurising the clamp ram 102, the detent device 106 and the lock valves 96 and 97. Thus the clamp ram is released, the detent device 106 engages the indent 108 in the spool 44 and the lock valves 96 and 97 become operative to close the passageways 92 and 93.

Since the spool 44 is now locked to the sleeve 49, during subsequent normal-digging operation the spool and sleeve together free-stroke in the bore 50 and have no effect whatsoever upon the normal-digging function. Thus the servo valve 45 is now completely ineffective in the boom-operating ram circuit, the boom ram 19 being operated, as the other rams, entirely "visually" under the control of its spool valve 60.

When the digging machine is required to dig a trench with a flat bottom, but on a gradient, the block 14 is adjusted in attitude with respect to the machine by rotation of the member 112 in the appropriate direction so that the cam slot 42 is set at the required angle. Broadly, the block 14 can be arranged to be positioned at any desired relative angle to any datum, not necessarily the machine itself.

Although not shown in the drawing, in certain cases pendulum means may be provided to give automaticity in this function so that the operation of the servo valve is responsive to automatically-established earth datums.

Hitherto in machines of the type described it has been difficult for the operator by the use of his control valves to cause the implement to travel in a straight line thus to dig trenches, for example having flat bases, and thus when trenches have been dug by such machines it has been necessary to complete the work by manual digging. By the present invention the digging implement is so precisely operated as to at least reduce the additional manual work arising from the above difficulty. Further, the operator obtains this result merely by operating a change-over valve and by continuing to operate the mechanism by one control member, the parallelogram linkage, pivot cam means and servo valve ensuring the desired path of the bucket for final accurate digging.

The invention is in no way limited to use of a preference flow valve, as in other embodiments a flow divider, or twin pump arrangement may instead be used.

The servo valve need not be effective upon the boom-operating ram as in other embodiments it is instead effective upon the dipstick-operating ram, or again means are provided in other embodiments whereby the boom-operating ram can be servo-controlled, but change-over means are provided whereby alternatively the dipstick-operating ram can instead be servo-controlled.

We claim:

1. An hydraulically-operated mechanism suitable for use in digging machines of the type including a first arm pivoted directly to the machine and a second arm pivoted to the first arm, the second arm in turn carrying a digging implement, the first arm being controllable by a fluid-pressure-operable ram extending to the arm directly from the machine and the second arm being controllable by a fluid-pressure-operable ram extending back to the first arm, the two rams being controllable by operation of respective control valves, and a pair of auxiliary links so pivotally connected together and also to said first and second arms as, therewith, to provide a parallelogram linkage, the pivot connecting the two auxiliary links engaging cam means, wherein the improvement comprises the provision of a single servo valve (45) which carries said cam means (42) and which can be brought into circuit with the ram (19) controlling one of said arms (12), (15), the pivot (41) then applying to the servo valve feed-back movement in dependence upon the constraining effect between the pivot and the cam means, which effect causes the said ram (19) controlling one of said arms (12) to superimpose upon the normally-controlled movement of the implement (18) by the other ram (24) such corrective displacement as to cause the implement accurately to follow a path predetermined by the shape of the cam means.

2. A mechanism as claimed in claim 1, wherein the attitude of the cam means (42) and of the servo valve (45) is adjustable with respect to the machine (11) to afford a degree of slope in the path of the implement.

3. A mechanism as claimed in claim 1, wherein said cam means comprises a member (43) having an elongated slot (42) with which said pivot (41) engages.

4. A mechanism as claimed in claim 3, wherein said member (43) is formed at the extremity of a rod connected to a displaceable element (44) forming part of the servo valve.

5. A mechanism as claimed in claim 4, wherein the axis of said slot (42) is set at right-angles to the axis of the displaceable element (44).

6. A mechanism as claimed in claim 4, wherein the displaceable element (44) is a spool which is housed for sliding movement within a ported sleeve (49), itself mounted for sliding movement in a block (14) carried on the machine (11).

7. A mechanism as claimed in claim 6, wherein the block (14) is pivotally mounted upon the machine (11) to enable said adjustment for variation in the path of the implement to be effected.

8. A mechanism as claimed in claim 6, wherein a clamping ram (102) is provided to lock the ported sleeve (49) with respect to the block (14).

9. A mechanism as claimed in claim 6, wherein the sleeve (49) is provided with a fluid-pressure-operable detent device (106) engageable with the spool (44).

10. A mechanism as claimed in claim 1, wherein the servo valve (45) is arranged so that it can be brought into circuit with the ram (19) which controls the first arm (12), a change-over valve (56) being provided to divert flow of pressure fluid to the servo valve.

11. A mechanism as claimed in claim 10, wherein a preference flow valve (75) is provided downstream of said change-over valve (56) so that when upon appropriate adjustment of the change-over valve the servo valve (45) is brought into circuit with the ram (19), the preference flow valve (75) ensures that before pressure fluid can pass to the ram (24), said clamping ram (102) is operated to lock the sleeve (49) of the servo valve with respect to the block (14) and ensures also that adequate pressure fluid is available for the ram (19) during servo operation.

12. A mechanism as claimed in claim 11, wherein said preference flow valve (75) is pressure-compensated so that the servo valve (45) can receive maximum supply pressure irrespective of the pressure level in the ram (24) at the same time.

13. A mechanism as claimed in claim 11, wherein lock valve means (96) and (97) are provided in passageways (92) and (93) which hydraulically connect the servo valve (45) to the ram (19), which lock valve means are rendered inoperative upon supply of pressure fluid by way of said preference flow valve (75) to the servo valve.

14. A mechanism as claimed in claim 13, wherein said clamping ram (102) is fluid-pressure-operable, engaging operation thereof and releasing operation of the said detent device (106) both occurring substantially simultaneously with movement of the lock valve means (96) and (97) to their inoperative positions.

References Cited

UNITED STATES PATENTS 3,343,693  9/1967  Becker _____ 214—138

HUGO O. SCHULZ, *Primary Examiner.*